US012802969B2

(12) United States Patent
Endo et al.

(10) Patent No.: US 12,802,969 B2
(45) Date of Patent: Nov. 17, 2026

(54) POSITIVE ELECTRODE FOR NONAQUEOUS ELECTROLYTE ENERGY STORAGE DEVICE, NONAQUEOUS ELECTROLYTE ENERGY STORAGE DEVICE, AND ENERGY STORAGE APPARATUS

(71) Applicant: GS Yuasa International Ltd., Kyoto (JP)

(72) Inventors: Daisuke Endo, Kyoto (JP); Naoki Inoue, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 692 days.

(21) Appl. No.: 18/035,024

(22) PCT Filed: Nov. 2, 2021

(86) PCT No.: PCT/JP2021/040315
§ 371 (c)(1),
(2) Date: May 2, 2023

(87) PCT Pub. No.: WO2022/097612
PCT Pub. Date: May 12, 2022

(65) Prior Publication Data
US 2023/0420656 A1 Dec. 28, 2023

(30) Foreign Application Priority Data
Nov. 6, 2020 (JP) ................................ 2020-186179

(51) Int. Cl.
*H01M 4/36* (2006.01)
*H01G 11/26* (2013.01)
(Continued)

(52) U.S. Cl.
CPC ............ *H01M 4/366* (2013.01); *H01G 11/26* (2013.01); *H01G 11/32* (2013.01); *H01M 4/136* (2013.01);
(Continued)

(58) Field of Classification Search
CPC .................. H01M 4/366; H01M 4/58; H01M 2004/021; H01G 11/32; H01G 11/36
See application file for complete search history.

(56) References Cited

U.S. PATENT DOCUMENTS 9,147,879 B2 9/2015 Moriguchi et al.
10,096,833 B2 10/2018 Hoshina et al.
(Continued)

FOREIGN PATENT DOCUMENTS

JP 2008-34306 A 2/2008
JP 2014-32803 A 2/2014
(Continued)

OTHER PUBLICATIONS

Machine translation of JP 2017-069177 (no date) (Year: 0000).*
International Search Report (ISR) dated Dec. 14, 2021 filed in PCT/JP2021/040315.

*Primary Examiner* — Amanda C. Walke
(74) *Attorney, Agent, or Firm* — RANKIN, HILL & CLARK LLP

(57) ABSTRACT

A positive electrode for nonaqueous electrolyte energy storage device according to an aspect of the present invention includes a positive composite layer containing a composite positive active material in which at least part of a surface of a positive active material is coated with carbon, a proportion of a pore specific surface area of the carbon to a pore specific surface area of the composite positive active material is 20% or more and 50% or less, a density of the positive composite layer is 1.80 g/cm$^3$ or more and 2.10 g/cm$^3$ or less, and the positive active material is a compound represented by the following Formula 1.

$$LiFe_xMn_{(1-x)}PO_4 (0 \leq x \leq 1) \quad 1$$

5 Claims, 2 Drawing Sheets

(51) Int. Cl.

| | |
|---|---|
| ***H01G 11/32*** | (2013.01) |
| ***H01M 4/136*** | (2010.01) |
| ***H01M 4/58*** | (2010.01) |
| ***H01M 4/62*** | (2006.01) |
| ***H01M 10/0525*** | (2010.01) |
| *H01M 4/02* | (2006.01) |

(52) U.S. Cl.

CPC ......... *H01M 4/5825* (2013.01); *H01M 4/625* (2013.01); *H01M 10/0525* (2013.01); *H01M 2004/021* (2013.01); *H01M 2004/028* (2013.01)

(56) References Cited

U.S. PATENT DOCUMENTS

| | | | | |
|---|---|---|---|---|
| 10,431,817 | B2 | 10/2019 | Yasumiishi et al. | |
| 10,680,240 | B2 | 6/2020 | Oshitari et al. | |
| 2010/0133467 | A1 | 6/2010 | Ikegawa | |
| 2012/0100422 | A1 | 4/2012 | Moriguchi et al. | |
| 2014/0298646 | A1 | 10/2014 | Ikegawa | |
| 2015/0180022 | A1 * | 6/2015 | Beck | C01B 25/45 252/182.1 |
| 2015/0188139 | A1 | 7/2015 | Kitagawa et al. | |
| 2016/0190586 | A1 * | 6/2016 | Hoshina | C01B 25/45 429/221 |
| 2018/0277838 | A1 * | 9/2018 | Yasumiishi | H01M 4/625 |
| 2019/0305304 | A1 | 10/2019 | Oshitari et al. | |
| 2023/0130712 | A1 * | 4/2023 | Endo | H01G 11/30 429/231.95 |

FOREIGN PATENT DOCUMENTS

| | | | | |
|---|---|---|---|---|
| JP | 2017-69177 | A | 4/2017 | |
| JP | 2018-160383 | A | 10/2018 | |
| JP | 2018-163762 | A | 10/2018 | |
| JP | 2019-160781 | A | 9/2019 | |
| JP | 2019-179679 | A | 10/2019 | |
| WO | 2008/105490 | A1 | 9/2008 | |
| WO | 2010/150857 | A1 | 12/2010 | |
| WO | WO-2012132387 | A1 * | 10/2012 | H01M 4/1391 |
| WO | 2014/017617 | A1 | 1/2014 | |
| WO | 2015/040747 | A1 | 3/2015 | |

* cited by examiner

POSITIVE ELECTRODE FOR NONAQUEOUS ELECTROLYTE ENERGY STORAGE DEVICE, NONAQUEOUS ELECTROLYTE ENERGY STORAGE DEVICE, AND ENERGY STORAGE APPARATUS

TECHNICAL FIELD

The present invention relates to a positive electrode for nonaqueous electrolyte energy storage device, a nonaqueous electrolyte energy storage device, and an energy storage apparatus.

BACKGROUND ART

Nonaqueous electrolyte secondary batteries typified by lithium ion secondary batteries are widely used for electronic devices such as personal computers and communication terminals, motor vehicles, and the like since these secondary batteries have a high energy density. The nonaqueous electrolyte secondary batteries generally include a pair of electrodes, which are electrically separated from each other by a separator, and a nonaqueous electrolyte interposed between the electrodes, and are configured to allow ions to be transferred between the two electrodes for charge-discharge. Capacitors such as lithium ion capacitors and electric double-layer capacitors are also widely used as nonaqueous electrolyte energy storage devices other than nonaqueous electrolyte secondary batteries.

In recent years, an olivine-type positive active material, which is inexpensive and highly safe, has attracted attention as a positive active material used in the nonaqueous electrolyte energy storage devices. Since this olivine-type positive active material has low electron conductivity, it is difficult to obtain a discharge capacity close to the theoretical capacity, but a technique of coating a surface with carbon for improving the electron conductivity has been proposed (see Patent Document 1).

PRIOR ART DOCUMENT

Patent Document

Patent Document 1: JP-A-2008-034306

SUMMARY OF THE INVENTION

Problems to be Solved by the Invention

However, in the case of being applied to starting batteries of motor vehicles and the like, power characteristics in a low temperature environment are required. The power characteristics in a low temperature environment are also affected by factors other than electron conductivity, and are thus required to be further improved in the case of using an olivine-type positive active material of which the surface is coated with carbon as well.

The present invention has been made in view of the above circumstances, and an object of the present invention is to provide a positive electrode for nonaqueous electrolyte energy storage device capable of enhancing the initial power performance of a nonaqueous electrolyte energy storage device in a low temperature environment.

Means for Solving the Problems

A positive electrode for nonaqueous electrolyte energy storage device according to an aspect of the present invention includes a positive composite layer containing a composite positive active material in which at least part of a surface of a positive active material is coated with carbon, a proportion of a pore specific surface area of the carbon to a pore specific surface area of the composite positive active material is 20% or more and 50% or less, a density of the positive composite layer is 1.80 g/cm$^3$ or more and 2.10 g/cm$^3$ or less, and the positive active material is a compound represented by the following Formula 1.

$$LiFe_xMn_{(1-x)}PO_4\ (0\leq x\leq 1) \qquad 1$$

Advantages of the Invention

The positive electrode for nonaqueous electrolyte energy storage device according to an aspect of the present invention can enhance the initial power performance of a nonaqueous electrolyte energy storage device and an energy storage apparatus in a low temperature environment.

MODE FOR CARRYING OUT THE INVENTION

Figure 1:
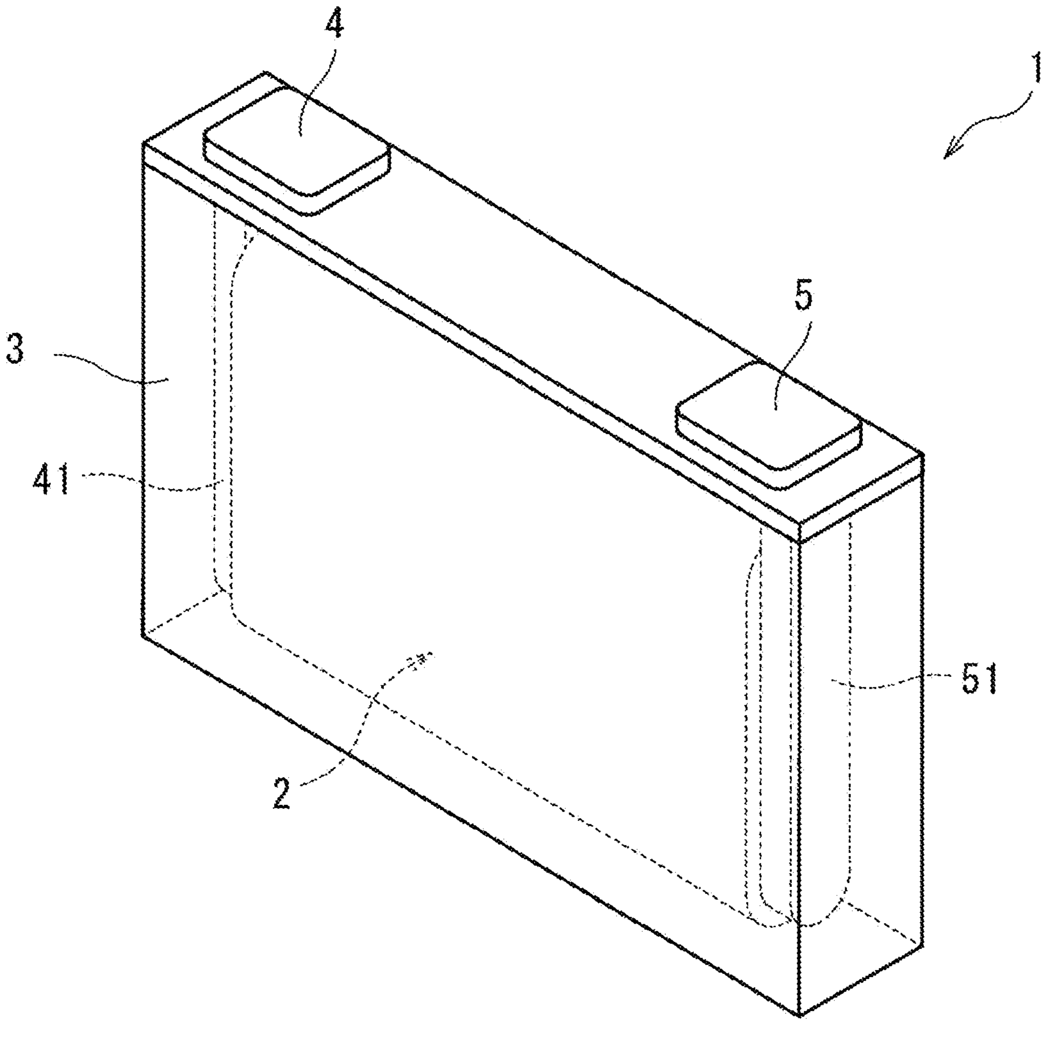
FIG. 1 is a see-through perspective view illustrating an embodiment of a nonaqueous electrolyte energy storage device.

First, outlines of a positive electrode for nonaqueous electrolyte energy storage device, a nonaqueous electrolyte energy storage device, and an energy storage apparatus disclosed by the present specification will be described.

A positive electrode for nonaqueous electrolyte energy storage device according to an aspect of the present invention includes a positive composite layer containing a composite positive active material in which at least part of a surface of a positive active material is coated with carbon, a proportion of a pore specific surface area of the carbon to a pore specific surface area of the composite positive active material is 20% or more and 50% or less, a density of the positive composite layer is 1.80 g/cm$^3$ or more and 2.10 g/cm$^3$ or less, and the positive active material is a compound represented by the following Formula 1.

$$LiFe_xMn_{(1-x)}PO_4\ (0\leq x\leq 1) \qquad 1$$

In the positive electrode for nonaqueous electrolyte energy storage device, as a positive composite layer containing a composite positive active material in which at least part of the surface of a positive active material having an olivine-type crystal structure composed of the compound represented by Formula 1 is coated with carbon is included, and the proportion of the pore specific surface area of the carbon to the pore specific surface area of the composite positive active material and the density of the positive composite layer are in specific ranges, the initial power performance of a nonaqueous electrolyte energy storage device in a low temperature environment can be enhanced. The reason for this is not clear, but is presumed as follows. Since the composite positive active material exhibits favorable electron conductivity as at least part of the surface is coated with carbon, the power in a low temperature environment tends to be governed by the diffusibility of lithium ions in the pores of the positive composite layer.

In the positive electrode for nonaqueous electrolyte energy storage device, as the proportion of the pore specific surface area of the carbon to the pore specific surface area of the composite positive active material is 20% or more and 50% or less, the carbon has appropriate denseness. Hence, in the positive electrode for nonaqueous electrolyte energy storage device, the diffusibility of lithium ions in the nonaqueous electrolyte in the pores between the carbon particles can be favorably maintained while the contact resistance between the carbon particles is lowered. In the positive electrode for nonaqueous electrolyte energy storage device, as the density of the positive composite layer is 1.80 $g/cm^3$ or more and 2.10 $g/cm^3$ or less, the positive composite layer exhibits appropriate adhesive properties. Hence, in the positive electrode for nonaqueous electrolyte energy storage device, the diffusibility of lithium ions of the nonaqueous electrolyte in the pores of the positive composite layer can be favorably maintained while the resistance is lowered. As a result, it is presumed that the lithium ion diffusibility in the pores of the positive composite layer is improved. Consequently, the positive electrode for nonaqueous electrolyte energy storage device can enhance the initial power performance of a nonaqueous electrolyte energy storage device in a low temperature environment.

A positive electrode for nonaqueous electrolyte energy storage device according to another aspect of the present invention includes a positive composite layer containing a composite positive active material in which at least part of a surface of a positive active material is coated with carbon, a proportion of a pore specific surface area of the carbon to a pore specific surface area of the composite positive active material is 20% or more and 50% or less, a pore specific surface area of the carbon is 1.0 $m^2/g$ or more and 5.5 $m^2/g$ or less, and the positive active material is a compound represented by the following Formula 1.

$$LiFe_xMn_{(1-x)}PO_4 \ (0 \leq x \leq 1) \qquad 1$$

In the positive electrode for nonaqueous electrolyte energy storage device, as the pore specific surface area of the carbon is 1.0 $m^2/g$ or more and 5.5 $m^2/g$ or less, elution of Fe ions from the composite positive active material can be suppressed. Thus, the amount of eluted Fe ions, which pass through the carbon coating the composite positive active material, decreases and the capacity retention ratio after storage can be improved.

The positive electrode for nonaqueous electrolyte energy storage device according to another aspect of the present invention includes a positive composite layer containing a composite positive active material in which at least part of a surface of a positive active material is coated with carbon, a proportion of a pore specific surface area of the carbon to a pore specific surface area of the composite positive active material is 20% or more and 50% or less, a pore specific surface area of the carbon is 1.0 $m^2/g$ or more and 5.5 $m^2/g$ or less, a density of the positive composite layer is 1.80 $g/cm^3$ or more and 2.10 $g/cm^3$ or less, and the positive active material is a compound represented by the following Formula 1.

$$LiFe_xMn_{(1-x)}PO_4 \ (0 \leq x \leq 1) \qquad 1$$

The positive electrode for nonaqueous electrolyte energy storage device can enhance the initial power performance of the nonaqueous electrolyte energy storage device in a low temperature environment and can improve the capacity retention ratio after storage.

A nonaqueous electrolyte energy storage device according to an aspect of the present invention includes the positive electrode. The nonaqueous electrolyte energy storage device includes a positive electrode containing the composite positive active material, and is thus excellent in the initial power performance in a low temperature environment.

An energy storage apparatus according to an aspect of the present invention includes two or more energy storage devices and one or more nonaqueous electrolyte energy storage devices according to an aspect of the present invention. The energy storage apparatus includes the nonaqueous electrolyte energy storage devices according to an aspect of the present invention, and is thus excellent in the initial power performance in a low temperature environment.

The configuration of a positive electrode for nonaqueous electrolyte energy storage device, the configuration of a nonaqueous electrolyte energy storage device, the configuration of an energy storage apparatus, a method of manufacturing a positive electrode for nonaqueous electrolyte energy storage device, and a method of manufacturing a nonaqueous electrolyte energy storage device according to an embodiment of the present invention, and other embodiments will be described in detail. The names of the respective constituent members (respective constituent elements) used in the respective embodiments may be different from the names of the respective constituent members (respective constituent elements) used in the background art.

<Positive Electrode for Nonaqueous Electrolyte Energy Storage Device>

The positive electrode for nonaqueous electrolyte energy storage device (hereinafter, also simply referred to as the positive electrode) includes a positive substrate and a positive composite layer disposed on the positive substrate directly or with an intermediate layer interposed therebetween.

[Positive Substrate]

The positive substrate exhibits conductivity. Whether the positive substrate exhibits "conductivity" is determined by the volume resistivity of $10^7$ Ω·cm measured in conformity with JIS-H-0505 (1975) as a threshold. As a material for the positive substrate, a metal such as aluminum, titanium, tantalum, or stainless steel, or any alloy thereof is used. Among these, aluminum or an aluminum alloy is preferable from the viewpoint of resistance to electric potential, degree of conductivity, and cost. Examples of the positive substrate include a foil, a deposited film, a mesh, and a porous material, and a foil is preferable from the viewpoint of cost. Accordingly, the positive substrate is preferably an aluminum foil or an aluminum alloy foil. Examples of the aluminum or aluminum alloy include A1085, A3003, and A1N30 specified in JIS-H-4000 (2014) or JIS-H-4160 (2006).

The average thickness of the positive substrate is preferably 3 μm or more and 50 μm or less, more preferably 5 μm or more and 40 μm or less, still more preferably 8 μm or more and 30 μm or less, particularly preferably 10 μm or more and 25 μm or less. By setting the average thickness of the positive substrate to the above range, it is possible to enhance the energy density per volume of a secondary battery while increasing the strength of the positive substrate.

The intermediate layer is a layer disposed between the positive substrate and the positive composite layer. The intermediate layer contains a conductive agent such as carbon particles to lower contact resistance between the positive substrate and the positive composite layer. The configuration of the intermediate layer is not particularly limited, and includes, for example, a binder and a conductive agent.

[Positive Composite Layer]

The positive composite layer contains a composite positive active material in which at least part of the surface of a positive active material is coated with carbon. The positive composite layer contains optional components such as a conductive agent, a binder, a thickener, and a filler if necessary.

(Composite Positive Active Material)

In the composite positive active material, at least part of the surface of a positive active material is coated with carbon.

The positive active material is a compound represented by the following Formula 1.

$LiFe_xMn_{(1-x)}PO_4$ $(0 \leq x \leq 1)$ 1

The compound represented by Formula 1 is a phosphate compound containing iron, manganese, or a combination thereof and lithium. The compound represented by Formula 1 has an olivine-type crystal structure. A compound having an olivine-type crystal structure has a crystal structure attributable to space group Pnma. The crystal structure attributable to space group Pnma means having a peak attributable to space group Pnma in an X-ray diffraction diagram. Since the compound represented by Formula 1 is a polyanion salt in which a reaction for oxygen extraction from a crystal lattice does not easily proceed, the compound has high safety and is inexpensive.

Examples of the positive active material include lithium iron phosphate ($LiFePO_4$), lithium manganese phosphate ($LiMnPO_4$), lithium manganese iron phosphate ($LiFe_xMn_{(1-x)}PO_4$, $0<x<1$) or a combination thereof. As the positive active material contains iron, manganese or a combination thereof as a transition metal, the charge-discharge capacity can be further increased.

The compound represented by Formula 1 may contain a transition metal element other than iron and manganese and a typical element such as aluminum. However, it is preferable that the compound represented by Formula 1 is substantially composed of iron, manganese or a combination thereof, lithium, phosphorus, and oxygen.

In Formula 1, the upper limit of x is 1, and is preferably 0.95. The lower limit of x is 0, and is preferably 0.25. As the value of x is equal to or less than the upper limit or equal to or more than the lower limit, excellent life characteristics are exhibited. Incidentally, x may be substantially 1.

The average particle size of primary particles of the positive active material is, for example, preferably 0.01 μm or more and 0.20 μm or less, more preferably 0.02 μm or more and 0.10 μm or less. By setting the average particle size of primary particles of the compound represented by Formula 1 to the above range, the diffusibility of lithium ions in the pores of the positive composite layer is improved.

The average particle size of secondary particles of the positive active material is, for example, preferably 3 μm or more and 20 μm or less, more preferably 5 μm or more and 15 μm or less. By setting the average particle size of secondary particles of the compound represented by Formula 1 to the above range, production and handling are facilitated, as well as the diffusibility of lithium ions in the pores of the positive composite layer is improved.

The "average particle size of primary particles" is a value measured through observation under a scanning electron microscope. The "average particle size of secondary particles" means a value at which a volume-based integrated distribution calculated in conformity with JIS-Z-8819-2 (2001) is 50% based on the particle size distribution measured on a diluted solution obtained by diluting particles with a solvent by a laser diffraction/scattering method in conformity with JIS-Z-8825 (2013).

A crusher, a classifier and the like are used to obtain a powder having a predetermined particle size. Examples of the crushing method include a method in which a mortar, a ball mill, a sand mill, a vibratory ball mill, a planetary ball mill, a jet mill, a counter jet mill, a whirling airflow type jet mill, a sieve or the like is used. At the time of crushing, wet type crushing in the presence of water or an organic solvent such as hexane can also be used. As a classification method, a sieve, a pneumatic classifier and the like are used both in dry manner and in wet manner if necessary.

In the composite positive active material, as at least part of the surface of the positive active material is coated with carbon, the electron conductivity can be improved. The content of carbon in the composite positive active material is preferably 0.5% by mass or more and 5% by mass or less. By setting the content of carbon to the above range, the electrical conductivity can be increased as well as the density of the positive composite layer and thus the capacity of the nonaqueous electrolyte energy storage device can be increased.

The lower limit of the pore specific surface area of carbon is preferably 0.1 $m^2/g$, more preferably 0.5 $m^2/g$, still more preferably 1.0 $m^2/g$. The upper limit of the pore specific surface area of carbon is preferably 5.7 $m^2/g$, more preferably 5.6 $m^2/g$, still more preferably 5.5 $m^2/g$.

The lower limit of the proportion of the pore specific surface area of carbon to the pore specific surface area of the composite positive active material is 20%, preferably 25%. As the proportion of the pore specific surface area of carbon is equal to or more than the lower limit, the diffusibility of the nonaqueous electrolyte can be favorably maintained, and thus the lithium ion diffusibility in the positive composite layer is improved. Consequently, the initial power performance of the nonaqueous electrolyte energy storage device in a low temperature environment can be enhanced. Meanwhile, the upper limit of the pore specific surface area ratio of carbon is 50%, preferably 45%. As the proportion of the pore specific surface area of carbon is equal to or less than the upper limit, the contact resistance between carbon particles can be lowered. Consequently, the initial power performance of the nonaqueous electrolyte energy storage device in a low temperature environment can be enhanced.

The pore specific surface areas of the composite positive active material and carbon are calculated by a nitrogen gas adsorption method based on the following procedure.

When the pore specific surface areas are measured, "autosorb iQ" and control analysis software "ASiQwin" developed by Quantachrome Instruments are used. In a sample tube for measurement, 1.00 g of the sample to be measured is placed, and dried under reduced pressure at 120° C. for 12 hours to sufficiently remove the moisture in the measurement sample. Next, by a nitrogen gas adsorption method using liquid nitrogen, isotherms on the adsorption side and the extraction side are measured in a relative pressure P/P0 (P0=about 770 mmHg) range of 0 to 1. The pore specific surface area is then determined through calculation by a BJH method using the isotherm on the extraction side. By subjecting the active material of which the surface is coated with carbon to a heat treatment at 400° C. for 2 hours in the air, only the carbon that is covered on the surface can be removed. Therefore, since the specific surface area of only the active material can be measured after the heat treatment, the specific surface area ratio of the carbon that is covered on the surface can be determined from the difference in specific surface area before and after the heat treatment.

In the measurement of the pore specific surface area, a powder before being charged and discharged of the composite positive active material before being used in fabrication of the positive electrode is subjected to the measurement as it is. Meanwhile, in a case where a measurement sample is collected from a positive electrode taken out from a disassembled nonaqueous electrolyte energy storage device, before the nonaqueous electrolyte energy storage device is disassembled, constant current discharge is performed to a voltage, which is the lower limit of a designated voltage in an environment of 25° C., at a current value (0.1 C) that is 1/10 of a current value to be an amount of electricity equal to a nominal capacity of the nonaqueous electrolyte energy storage device when the nonaqueous electrolyte energy storage device is energized at a constant current for 1 hour. The nonaqueous electrolyte energy storage device is disassembled to take out the positive electrode, a battery using a metal lithium electrode as the counter electrode is assembled, constant current discharge is performed at a current value of 10 mA per 1 g of a positive composite until the voltage between terminals of the positive electrode reaches 2.0 V (vs. $Li/Li^+$) in an environment of 25° C. to adjust the positive electrode to the completely discharged state. Thereafter, the battery is disassembled again, and the positive electrode is taken out. The positive electrode taken out is sufficiently washed with dimethyl carbonate to remove the nonaqueous electrolyte attached to the positive electrode, and is dried at room temperature for a whole day and night, and the positive composite on the positive substrate is then collected. The operations to the disassembly of the battery, and the washing and drying operations of the positive electrode are performed in an argon atmosphere having a dew point of −60° C. or less. The obtained positive composite is dispersed in N-methylpyrrolidone (NMP), and the binder (PVdF) in the positive composite is removed. Furthermore, the conductive agent is removed from the powder obtained through washing with dimethyl carbonate and then drying by air classification and the like. In the measurement of the pore specific surface area, the positive composite collected in this manner can be subjected to the measurement.

The lower limit of the density of the positive composite layer is 1.80 g/cm$^3$, preferably 1.85 g/cm$^3$. As the density of the positive composite layer is equal to or more than the lower limit, the adhesive properties of the positive active material can be improved, and the resistance of the positive electrode for nonaqueous electrolyte energy storage device can be thus lowered. Consequently, the initial power performance of the nonaqueous electrolyte energy storage device in a low temperature environment can be enhanced. Meanwhile, the upper limit of the density of the positive composite layer is 2.10 g/cm$^3$, preferably 2.05 g/cm$^3$. As the density of the positive composite layer is equal to or less than the upper limit, the diffusibility of the nonaqueous electrolyte can be favorably maintained, and thus the lithium ion diffusibility in the pores of the positive composite layer is improved. Consequently, the initial power performance of the nonaqueous electrolyte energy storage device in a low temperature environment can be enhanced.

The density of the positive composite layer is calculated by measuring the mass per unit area of the positive composite layer, measuring the average thickness of the positive composite layer, and dividing the acquired mass per unit area by the average thickness. Before the nonaqueous electrolyte energy storage device is assembled, the density of the positive composite layer is measured as it is. After the nonaqueous electrolyte energy storage device is assembled, the density of the positive composite layer of the positive electrode adjusted to the completely discharged state is measured by the method described above. The average thickness of the positive composite layer is acquired by measuring the thickness at 10 arbitrary points and calculating the average value of the measurement results.

The content of the composite positive active material in the positive composite layer is preferably 50% by mass or more and 99% by mass or less, more preferably 70% by mass or more and 98% by mass or less, still more preferably 80% by mass or more and 95% by mass or less. By setting the content of the composite positive active material to the above range, it is possible to achieve both high energy density of the positive composite layer and productivity.

(Optional Components)

The carbon contained in the composite positive active material also exhibits electrical conductivity, but the positive composite layer may, if necessary, contain a conductive agent in addition to the carbon contained in the composite positive active material. The conductive agent is not particularly limited as long as it is a material exhibiting electrical conductivity. Examples of such a conductive agent include carbonaceous materials, metals, and conductive ceramics. Examples of the carbonaceous materials include graphite, non-graphitic carbon, and graphene-based carbon. Examples of the non-graphitic carbon include carbon nanofibers, pitch-based carbon fibers, and carbon black. Examples of the carbon black include furnace black, acetylene black, and ketjen black. Examples of the graphene-based carbon include graphene, carbon nanotubes (CNTs), and fullerene. Examples of the shape of the conductive agent include a powdery shape and a fibrous shape. As the conductive agent, one of these materials may be used singly, or two or more thereof may be used in mixture. These materials may be composited and used. For example, a material obtained by compositing carbon black with CNT may be used. Among these materials, carbon black is preferable from the viewpoint of electron conductivity and coatability, and in particular, acetylene black is preferable.

The content of the conductive agent in the positive composite layer is preferably 1% by mass or more and 10% by mass or less, more preferably 3% by mass or more and 9% by mass or less. By setting the content of the conductive agent to the above range, the energy density of the nonaqueous electrolyte energy storage device can be enhanced.

Examples of the binder include: thermoplastic resins such as fluororesin (polytetrafluoroethylene (PTFE), polyvinylidene fluoride (PVDF), etc.), polyethylene, polypropylene, polyacryl, and polyimide; elastomers such as an ethylene-propylene-diene rubber (EPDM), sulfonated EPDM, a styrene butadiene rubber (SBR), and a fluororubber; and polysaccharide polymers.

The content of the binder in the positive composite layer is preferably 1% by mass or more and 10% by mass or less, more preferably 3% by mass or more and 9% by mass or less. By setting the content of the binder to the above range, the active material can be stably held.

Examples of the thickener include polysaccharide polymers such as carboxymethylcellulose (CMC) and methylcellulose. In a case where the thickener has a functional group that is reactive with lithium and the like, the functional group may be deactivated by methylation or the like in advance.

The filler is not particularly limited. Examples of the filler include polyolefins such as polypropylene and polyethylene, inorganic oxides such as silicon dioxide, alumina, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, and barium sulfate, nitrides such as aluminum nitride and silicon nitride, and substances derived from mineral resources, such as talc, montmorillonite, boehmite, zeolite, apatite, kaolin, mullite, spinel, olivine, sericite, bentonite and mica, or artificial products thereof.

The positive composite layer may contain a typical nonmetal element such as B, N, P, F, Cl, Br, or I, a typical metal element such as Li, Na, Mg, Al, K, Ca, Zn, Ga, Ge, Sn, Sr, or Ba or a transition metal element such as Sc, Ti, V, Cr, Mn, Fe, Co, Ni, Cu, Mo, Zr, Nb, or W as a component other than the positive active material, the conductive agent, the binder, the thickener, and the filler.

[Method of Manufacturing Positive Electrode for Nonaqueous Electrolyte Energy Storage Device]

A method of manufacturing a positive electrode according to an embodiment of the present invention includes fabricating a positive electrode using a composite positive active material in which at least part of the surface of the positive active material is coated with carbon. The positive electrode for nonaqueous electrolyte energy storage device is not particularly limited, but can be manufactured, for example, by the following method.

The positive electrode can be fabricated, for example, by applying a positive composite paste to a positive substrate directly or with an intermediate layer interposed therebetween, and performing drying. The positive composite paste contains components constituting the positive composite layer such as a composite positive active material in which at least part of the surface of a positive active material is coated with carbon, and a conductive agent, a binder and the like that are optional components. The positive composite paste may further contain a dispersion medium.

The composite positive active material can be produced, for example, based on the following procedure.

First, while a mixed solution of $FeSO_4$ and $MnSO_4$ at an arbitrary ratio is added dropwise at a constant rate into a reaction case containing ion-exchange water, an aqueous NaOH solution, an aqueous $NH_3$ solution and an aqueous $NH_2NH_2$ solution are added dropwise so that the pH during that time is maintained at a constant value, thereby producing a $Fe_xMn_{1-x}(OH)_2$ precursor. Next, the prepared $Fe_xMn_{(1-x)}(OH)_2$ precursor is solid-phase mixed with $LiH_2PO_4$ and sucrose powder. Thereafter, calcination is performed at a calcination temperature of 550° C. or more and 750° C. or less in a nitrogen atmosphere, thereby producing a composite positive active material, which has an olivine-type crystal structure and in which at least part of the surface of a positive active material represented by the following Formula 1 is coated with carbon.

$$LiFe_xMn_{(1-x)}PO_4\ (0\leq x\leq 1) \qquad 1$$

In the method of producing the composite positive active material, by using $NH_3$ as a complexing agent and $NH_2NH_2$ as an antioxidant, the pore specific surface area of the positive active material can be set to a favorable range. In a case where $NH_3$ and $NH_2NH_2$ are not used, the pore specific surface area of the positive active material is too small, and initial power in a low temperature environment may not be sufficiently acquired. As described above, in the method of producing the composite positive active material, a pore structure that promotes permeation of the nonaqueous electrolyte can be acquired through use of $NH_3$ and $NH_2NH_2$ and control of pH.

The pore specific surface area of carbon can be adjusted by controlling the calcination temperature and calcination time in the method of producing the composite positive active material.

The density of the positive composite layer can be adjusted by controlling the pressure of the press during compression molding using a roll press or the like.

According to the positive electrode for nonaqueous electrolyte energy storage device, the initial power performance of a nonaqueous electrolyte energy storage device in a low temperature environment can be enhanced.

<Nonaqueous Electrolyte Energy Storage Device>

A nonaqueous electrolyte energy storage device according to an embodiment of the present invention includes an electrode assembly including the positive electrode, a negative electrode, and a separator; a nonaqueous electrolyte; and a case that houses the electrode assembly and the nonaqueous electrolyte. The electrode assembly is typically a stacked type obtained by stacking a plurality of positive electrodes and a plurality of negative electrodes with a separator interposed therebetween, or a wound type obtained by winding a positive electrode and a negative electrode stacked with a separator interposed therebetween. The nonaqueous electrolyte is present to be impregnated in the positive electrode, the negative electrode, and the separator. A nonaqueous electrolyte secondary battery (hereinafter, also simply referred to as a "secondary battery") will be described as an example of the nonaqueous electrolyte energy storage device.

[Positive Electrode]

The positive electrode included in the nonaqueous electrolyte energy storage device is as described above. The nonaqueous electrolyte energy storage device includes a positive electrode containing the composite positive active material, and is thus excellent in the initial power performance in a low temperature environment.

[Negative Electrode]

The negative electrode includes a negative substrate and a negative composite layer disposed on the negative substrate directly or with an intermediate layer interposed therebetween. The configuration of the intermediate layer is not particularly limited, and for example, can be selected from the configurations exemplified for the positive electrode.

The negative substrate exhibits electrical conductivity. As the material for the negative substrate, a metal such as copper, nickel, stainless steel, nickel-plated steel, or aluminum, any alloy thereof, a carbonaceous material, or the like is used. Among these, copper or a copper alloy is preferable. Examples of the negative substrate include a foil, a deposited film, a mesh, and a porous material, and a foil is preferable from the viewpoint of cost. Accordingly, the negative substrate is preferably a copper foil or a copper alloy foil. Examples of the copper foil include a rolled copper foil and an electrolytic copper foil.

The average thickness of the negative substrate is preferably 2 μm or more and 35 μm or less, more preferably 3 μm or more and 30 μm or less, still more preferably 4 μm or more and 25 μm or less, particularly preferably 5 μm or more and 20 μm or less. By setting the average thickness of the negative substrate to the above range, it is possible to enhance the energy density per volume of a secondary battery while increasing the strength of the negative substrate.

The negative composite layer contains a negative active material. The negative composite layer contains optional components such as a conductive agent, a binder, a thickener, and a filler if necessary. The optional components such as a conductive agent, a binder, a thickener, and a filler can be selected from the materials exemplified for the positive electrode.

The negative composite layer may contain a typical nonmetal element such as B, N, P, F, Cl, Br, or I, a typical metal element such as Li, Na, Mg, Al, K, Ca, Zn, Ga, Ge, Sn, Sr, or Ba or a transition metal element such as Sc, Ti, V, Cr, Mn, Fe, Co, Ni, Cu, Mo, Zr, Ta, Hf, Nb, or W as a component other than the negative active material, the conductive agent, the binder, the thickener, and the filler.

The negative active material can be appropriately selected from known negative active materials. As the negative active material for lithium ion secondary battery, a material capable of storing and releasing lithium ions is usually used. Examples of the negative active material include metal Li; metals or metalloids such as Si and Sn; metal oxides or metalloid oxides such as Si oxide, Ti oxide, and Sn oxide; titanium-containing oxides such as $Li_4Ti_5O_{12}$, $LiTiO_2$, and $TiNb_2O_7$; a polyphosphoric acid compound; silicon carbide; and carbon materials such as graphite and non-graphitic carbon (easily graphitizable carbon or hardly graphitizable carbon). Among these materials, graphite and non-graphitic carbon are preferable. In the negative composite layer, one of these materials may be used singly or two or more thereof may be used in mixture.

The term “graphite” refers to a carbon material in which an average lattice spacing ($d_{002}$) of a (002) plane determined by X-ray diffraction before charge-discharge or in a discharged state is 0.33 nm or more and less than 0.34 nm. Examples of the graphite include natural graphite and artificial graphite. Artificial graphite is preferable from the viewpoint that a material having stable physical properties can be procured.

The term “non-graphitic carbon” refers to a carbon material in which the average lattice spacing ($d_{002}$) of a (002) plane determined by X-ray diffraction before charge-discharge or in the discharged state is 0.34 nm or more and 0.42 nm or less. Examples of the non-graphitic carbon include hardly graphitizable carbon and easily graphitizable carbon. Examples of the non-graphitic carbon include a resin-derived material, a petroleum pitch or a material derived from petroleum pitch, a petroleum coke or a material derived from petroleum coke, a plant-derived material, and an alcohol-derived material.

In this regard, the “discharged state” means a state discharged so that lithium ions that can be stored and released in association with charge-discharge are sufficiently released from the carbon material as the negative active material. For example, the “discharged state” refers to a state where an open circuit voltage is 0.7 V or more in a monopolar battery in which a negative electrode containing a carbon material as a negative active material is used as a working electrode and metal Li is used as a counter electrode.

The term “hardly graphitizable carbon” refers to a carbon material in which the $d_{002}$ is 0.36 nm or more and 0.42 nm or less.

The term “easily graphitizable carbon” refers to a carbon material in which the $d_{002}$ is 0.34 nm or more and less than 0.36 nm.

The negative active material is typically particles (powder). The average particle size of the negative active material can be, for example, 1 nm or more and 100 μm or less. In a case where the negative active material is a carbon material, a titanium-containing oxide, or a polyphosphoric acid compound, the average particle size thereof may be 1 μm or more and 100 μm or less. In a case where the negative active material is Si, Sn, an oxide of Si, an oxide of Sn, or the like, the average particle size thereof may be 1 nm or more and 1 μm or less. By setting the average particle size of the negative active material to be equal to or more than the lower limit, the negative active material is easily produced or handled. By setting the average particle size of the negative active material to be equal to or less than the upper limit, the electron conductivity of the negative composite layer is improved. A crusher, a classifier and the like are used to obtain a powder having a predetermined particle size. The crushing method and the powder classification method can be selected from, for example, the methods exemplified for the positive electrode. In a case where the negative active material is a metal such as metal Li, the negative active material may be in the form of a foil.

The content of the negative active material in the negative composite layer is preferably 60% by mass or more and 99% by mass or less, more preferably 90% by mass or more and 98% by mass or less. By setting the content of the negative active material to the above range, it is possible to achieve both high energy density of the negative composite layer and productivity.

[Separator]

The separator can be appropriately selected from known separators. As the separator, for example, a separator composed of only a substrate layer, a separator in which a heat resistant layer containing heat resistant particles and a binder is formed on one surface or both surfaces of the substrate layer, or the like can be used. Examples of the form of the substrate layer of the separator include a woven fabric, a nonwoven fabric, and a porous resin film. Among these forms, a porous resin film is preferable from the viewpoint of strength, and a nonwoven fabric is preferable from the viewpoint of liquid retaining properties of the nonaqueous electrolyte. As the material for the substrate layer of the separator, for example, a polyolefin such as polyethylene or polypropylene is preferable from the viewpoint of shutdown function, and polyimide, aramid or the like is preferable from the viewpoint of resistance to oxidation and decomposition. As the substrate layer of the separator, a material obtained by combining these resins may be used.

The heat resistant particles contained in the heat resistant layer preferably have a mass loss of 5% or less when the temperature is raised from room temperature to 500° C. in the air atmosphere of 1 atm, and more preferably have a mass loss of 5% or less when the temperature is raised from room temperature to 800° C. Inorganic compounds can be mentioned as materials whose mass loss is equal to or less than the predetermined value. Examples of the inorganic compounds include oxides such as iron oxide, silicon oxide, aluminum oxide, titanium dioxide, zirconium oxide, calcium oxide, strontium oxide, barium oxide, magnesium oxide and aluminosilicate; nitrides such as aluminum nitride and silicon nitride; carbonates such as calcium carbonate; sulfates such as barium sulfate; hardly soluble ionic crystals such as calcium fluoride, barium fluoride, barium titanate; covalently bonded crystals such as silicon and diamond; and substances derived from mineral resources, such as talc, montmorillonite, boehmite, zeolite, apatite, kaolin, mullite, spinel, olivine, sericite, bentonite and mica, and artificial products thereof. As the inorganic compounds, a simple substance or a complex of these substances may be used singly, or two or more thereof may be used in mixture. Among these inorganic compounds, silicon oxide, aluminum oxide, or aluminosilicate is preferable from the viewpoint of safety of the nonaqueous electrolyte energy storage device.

A porosity of the separator is preferably 80% by volume or less from the viewpoint of strength, and is preferably 20% by volume or more from the viewpoint of discharge performance. The term "porosity" herein is a volume-based value, and means a value measured using a mercury porosimeter.

As the separator, a polymer gel composed of a polymer and a nonaqueous electrolyte may be used. Examples of the polymer include polyacrylonitrile, polyethylene oxide, polypropylene oxide, polymethyl methacrylate, polyvinyl acetate, polyvinylpyrrolidone, and polyvinylidene fluoride. The use of the polymer gel affords the effect of suppressing liquid leakage. As the separator, a polymer gel may be used in combination with a porous resin film, a nonwoven fabric, or the like as described above.

[Nonaqueous Electrolyte]

The nonaqueous electrolyte can be appropriately selected from known nonaqueous electrolytes. As the nonaqueous electrolyte, a nonaqueous electrolyte solution may be used. The nonaqueous electrolyte solution contains a nonaqueous solvent and an electrolyte salt dissolved in the nonaqueous solvent.

The nonaqueous solvent can be appropriately selected from known nonaqueous solvents. Examples of the nonaqueous solvent include cyclic carbonates, chain carbonates, carboxylic acid esters, phosphoric acid esters, sulfonic acid esters, ethers, amides, and nitriles. As the nonaqueous solvent, those in which some hydrogen atoms contained in these compounds are substituted with halogen may be used.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, 1-phenylvinylene carbonate, and 1,2-diphenylvinylene carbonate. Among these, EC is preferable.

Examples of the chain carbonate include diethyl carbonate (DEC), dimethyl carbonate (DMC), ethyl methyl carbonate (EMC), diphenyl carbonate, trifluoroethyl methyl carbonate, and bis(trifluoroethyl)carbonate. Among these, EMC is preferable.

As the nonaqueous solvent, it is preferable to use the cyclic carbonate or the chain carbonate, and it is more preferable to use the cyclic carbonate and the chain carbonate in combination. By using a cyclic carbonate, dissociation of the electrolyte salt can be promoted to improve ionic conductivity of the nonaqueous electrolyte solution. By using a chain carbonate, the viscosity of the nonaqueous electrolyte solution can be kept low. In a case where a cyclic carbonate and a chain carbonate are used in combination, a volume ratio of the cyclic carbonate to the chain carbonate (cyclic carbonate:chain carbonate) is preferably in a range from 5:95 to 50:50, for example.

The electrolyte salt can be appropriately selected from known electrolyte salts. Examples of the electrolyte salt include a lithium salt, a sodium salt, a potassium salt, a magnesium salt, and an onium salt. Among these, a lithium salt is preferable.

Examples of the lithium salt include inorganic lithium salts such as $LiPF_6$, $LiPO_2F_2$, $LiBF_4$, $LiClO_4$, and $LiN(SO_2F)_2$, lithium oxalates such as lithium bis(oxalate) borate (LiBOB), lithium difluorooxalatoborate (LiDFOB), and lithium bis(oxalate) difluorophosphate (LiFOP), and lithium salts having a halogenated hydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$. Among these, an inorganic lithium salt is preferable, and $LiPF_6$ is more preferable.

The content of the electrolyte salt in the nonaqueous electrolyte solution is, at 20° C. and 1 atm, preferably 0.1 mol/km$^3$ or more and 2.5 mol/dm$^3$ or less, more preferably 0.3 mol/dm$^3$ or more and 2.0 mol/dm$^3$ or less, still more preferably 0.5 mol/dm$^3$ or more and 1.7 mol/dm$^3$ or less, particularly preferably 0.7 mol/dm$^3$ or more and 1.5 mol/dm$^3$ or less. By setting the content of the electrolyte salt to the above range, the ionic conductivity of the nonaqueous electrolyte solution can be increased.

The nonaqueous electrolyte solution may contain an additive in addition to the nonaqueous solvent and the electrolyte salt. Examples of the additive include halogenated carbonic acid esters such as fluoroethylene carbonate (FEC) and difluoroethylene carbonate (DFEC); oxalic acid salts such as lithium bis(oxalate) borate (LiBOB), lithium difluorooxalatoborate (LiDFOB), and lithium bis(oxalate) difluorophosphate (LiFOP); imide salts such as lithium bis(fluorosulfonyl)imide (LiFSI); aromatic compounds such as biphenyl, alkylbiphenyl, terphenyl, partly hydrogenated terphenyl, cyclohexylbenzene, t-butylbenzene, t-amylbenzene, diphenyl ether, and dibenzofuran; partial halides of the aromatic compounds such as 2-fluorobiphenyl, o-cyclohexylfluorobenzene, and p-cyclohexylfluorobenzene; halogenated anisole compounds such as 2,4-difluoroanisole, 2,5-difluoroanisole, 2,6-difluoroanisole, and 3,5-difluoroanisole; vinylene carbonate, methylvinylene carbonate, ethylvinylene carbonate, succinic anhydride, glutaric anhydride, maleic anhydride, citraconic anhydride, glutaconic anhydride, itaconic anhydride, cyclohexanedicarboxylic anhydride; ethylene sulfite, propylene sulfite, dimethyl sulfite, methyl methanesulfonate, busulfan, methyl toluenesulfonate, dimethyl sulfate, ethylene sulfate, sulfolane, dimethyl sulfone, diethyl sulfone, dimethyl sulfoxide, diethyl sulfoxide, tetramethylene sulfoxide, diphenyl sulfide, 4,4'-bis(2,2-dioxo-1,3,2-dioxathiolane, 4-methylsulfonyloxymethyl-2,2-dioxo-1,3,2-dioxathiolane, thioanisole, diphenyl disulfide, dipyridinium disulfide, 1,3-propene sultone, 1,3-propane sultone, 1,4-butane sultone, 1,4-butene sultone, perfluorooctane, tristrimethylsilyl borate, tristrimethylsilyl phosphate, tetrakistrimethylsilyl titanate, lithium monofluorophosphate, and lithium difluorophosphate. One of these additives may be used singly, or two or more thereof may be used in mixture.

The content of the additive contained in the nonaqueous electrolyte solution is preferably 0.01% by mass or more and 10% by mass or less, more preferably 0.1% by mass or more and 7% by mass or less, still more preferably 0.2% by mass or more and 5% by mass or less, particularly preferably 0.3% by mass or more and 3% by mass or less with respect to the mass of the entire nonaqueous electrolyte solution. By setting the content of the additive to the above range, it is possible to improve the capacity retention performance or cycle performance after high-temperature storage, or to further improve the safety.

As the nonaqueous electrolyte, a solid electrolyte may be used, or a nonaqueous electrolyte solution and a solid electrolyte may be used in combination.

The solid electrolyte can be selected from arbitrary materials, which have ionic conductivity and are solid at normal temperature (for example, from 15° C. to 25° C.), such as lithium, sodium and calcium. Examples of the solid electrolyte include a sulfide solid electrolyte, an oxide solid electrolyte, an oxynitride solid electrolyte, and a polymer solid electrolyte.

Examples of the sulfide solid electrolyte include $Li_2S—P_2S_5$, $LiI—Li_2S—P_2S_5$, and $LiioGe-P_2S_{12}$.

The shape of the nonaqueous electrolyte energy storage device according to the present embodiment is not particularly limited, and examples thereof include cylindrical batteries, prismatic batteries, flat batteries, coin batteries and button batteries.

FIG. 1 illustrates a nonaqueous electrolyte energy storage device 1 as an example of prismatic batteries. FIG. 1 is a view illustrating the inside of a case in a perspective manner. An electrode assembly 2 including a positive electrode and a negative electrode, which are wound with a separator interposed therebetween, is housed in a prismatic case 3. The positive electrode is electrically connected to a positive electrode terminal 4 via a positive electrode lead 41. The negative electrode is electrically connected to a negative electrode terminal 5 via a negative electrode lead 51.

[Configuration of Nonaqueous Electrolyte Energy Storage Apparatus]

The nonaqueous electrolyte energy storage device of the present embodiment can be mounted as an energy storage apparatus configured by assembling a plurality of nonaqueous electrolyte energy storage devices 1 on a power source for motor vehicles such as electric vehicles (EV), hybrid vehicles (HEV), and plug-in hybrid vehicles (PHEV), a power source for electronic devices such as personal computers and communication terminals, a power source for power storage, or the like. In this case, the technique of the present invention may be applied to at least one nonaqueous electrolyte energy storage device included in the energy storage apparatus.

Figure 2:
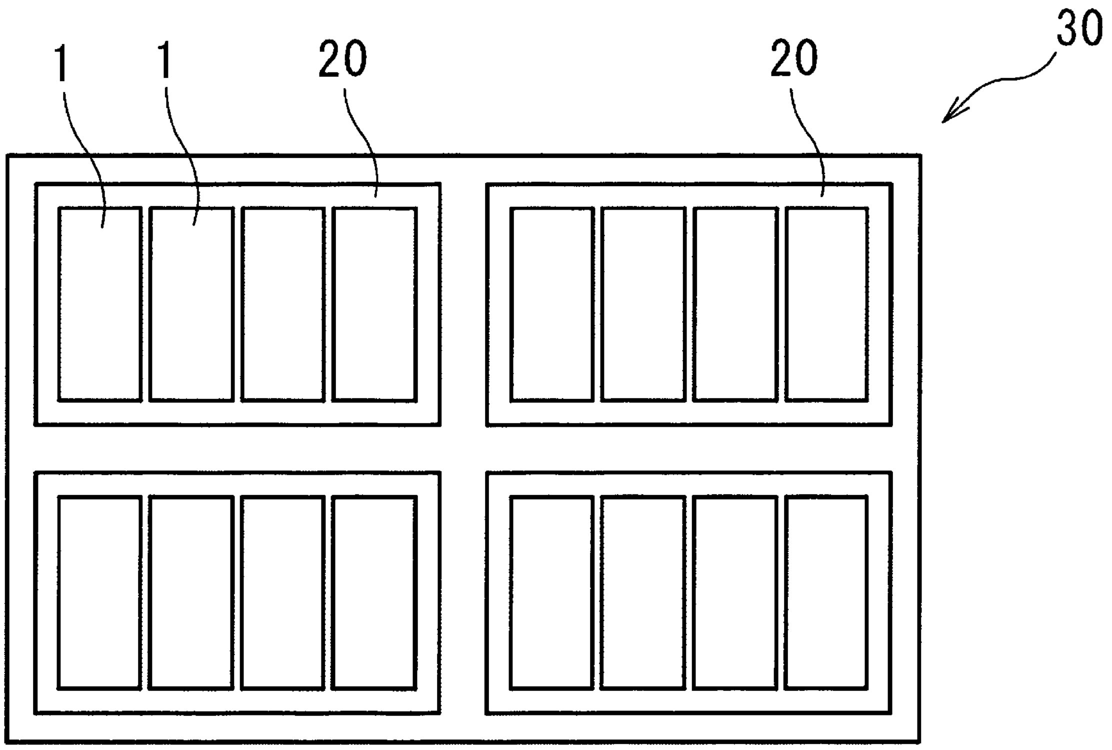
FIG. 2 is a schematic diagram illustrating an embodiment of an energy storage apparatus including a plurality of nonaqueous electrolyte energy storage devices.

An energy storage apparatus according to an embodiment of the present invention is an energy storage apparatus including two or more energy storage devices and includes one or more nonaqueous electrolyte energy storage devices according to an embodiment of the present invention. FIG. 2 illustrates an example of an energy storage apparatus 30 formed by assembling energy storage units 20 in each of which two or more electrically connected nonaqueous electrolyte energy storage devices 1 are assembled. The energy storage apparatus 30 may include a busbar (not illustrated) for electrically connecting two or more nonaqueous electrolyte energy storage devices 1 and a busbar (not illustrated) for electrically connecting two or more energy storage units 20. The energy storage unit 20 or the energy storage apparatus 30 may include a state monitor (not illustrated) that monitors the state of one or more nonaqueous electrolyte energy storage devices.

[Method of Manufacturing Nonaqueous Electrolyte Energy Storage Device]

The nonaqueous electrolyte energy storage device can be manufactured by a known method except that the positive electrode described above is used as a positive electrode. The method of manufacturing the nonaqueous electrolyte energy storage device according to the present embodiment can be appropriately selected from known methods. The method of manufacturing the nonaqueous electrolyte energy storage device includes, for example, preparing an electrode assembly, preparing a nonaqueous electrolyte, and housing the electrode assembly and the nonaqueous electrolyte in a case. The preparation of the electrode assembly includes preparing the positive electrode and a negative electrode, and forming an electrode assembly by stacking or winding the positive electrode and the negative electrode with a separator interposed therebetween.

Housing of the nonaqueous electrolyte in a case can be appropriately selected from known methods. For example, in a case where a nonaqueous electrolyte solution is used for the nonaqueous electrolyte, the nonaqueous electrolyte solution may be injected from the inlet formed in the case, and then the inlet may be sealed.

OTHER EMBODIMENTS

The nonaqueous electrolyte energy storage device of the present invention is not limited to the embodiments described above, and various changes may be made without departing from the gist of the present invention. For example, to the configuration of one embodiment, the configuration of another embodiment can be added, and part of the configuration of one embodiment can be replaced by the configuration of another embodiment or a well-known technique. Furthermore, part of the configuration of one embodiment can be deleted. In addition, a well-known technique can be added to the configuration of one embodiment.

In the embodiments, a case where the nonaqueous electrolyte energy storage device is used as a nonaqueous electrolyte secondary battery (for example, lithium ion secondary battery) that can be charged and discharged has been described, but the type, shape, dimensions, capacity, and the like of the nonaqueous electrolyte energy storage device are arbitrary. The present invention can also be applied to capacitors such as various secondary batteries, electric double layer capacitors, and lithium ion capacitors.

In the embodiments, an electrode assembly in which a positive electrode and a negative electrode are stacked with a separator interposed therebetween has been described, but the electrode assembly may not include a separator. For example, the positive electrode and the negative electrode may be brought into direct contact with each other in a state in which a layer not exhibiting electrical conductivity is formed on the composite layer of the positive electrode or negative electrode.

EXAMPLES

Hereinafter, the present invention will be described more specifically with reference to Examples. The present invention is not limited to the following Examples.

Examples 1 to 8 and Comparative Examples 1 to 7

(Production of Composite Positive Active Material)

First, while a 1 mol/km$^3$ aqueous $FeSO_4$ solution was added dropwise at a constant rate into a 2 dm$^3$ reaction case containing 750 cm$^3$ of ion-exchange water, a 4 mol/dm$^3$ aqueous NaOH solution, a 0.5 mol/dm$^3$ aqueous $NH_3$ solution, and a 0.5 mol/km$^3$ aqueous $NH_2NH_2$ solution were added dropwise so that the pH during that time was maintained at the value shown in Table 1, thereby producing a $Fe(OH)_2$ precursor. The temperature of the reaction case was set at 50° C. (±2° C.). Next, the produced $Fe(OH)_2$ precursor was solid-phase mixed with $LiH_2PO_4$ and sucrose powder. Thereafter, calcination was performed in a nitrogen atmosphere, thereby producing composite positive active materials of Examples 1 to 8 and Comparative Examples 1 to 7 in which the entire surface of the positive active material $LiFePO_4$ represented by Formula 1 was coated with carbon.

In these composite positive active materials, the proportion of the pore specific surface area of carbon to the pore specific surface area of the composite positive active material was adjusted by the pH during the production of precursor, the calcination temperature and the calcination time. Table 1 shows the pH during the production of precursor, calcination temperature and calcination time in Examples 1 to 8 and Comparative Examples 1 to 7.

Table 1 shows the pore specific surface area of carbon, the total pore specific surface area, and the proportion of the pore specific surface area of carbon to the pore specific surface area of the composite positive active material in Examples 1 to 8 and Comparative Examples 1 to 7. The pore specific surface area was measured by the method described above.

Composite positive active materials of Examples 9 to 13 and Comparative Examples 8 to 10 were produced in the same manner as in Example 1 except that the pore specific surface area of carbon was adjusted by adjusting the calcination temperature and the amount of sucrose powder mixed with respect to the amount of the composite positive active material. Table 2 shows the calcination temperature and the amount of sucrose powder mixed with respect to the amount of the composite positive active material in Examples 9 to 13 and Comparative Examples 8 to 10. Table 2 shows the pore specific surface area of carbon and the proportion of the pore specific surface area of carbon to the pore specific surface area of the composite positive active material in Examples 9 to 13 and Comparative Examples 8 to 10. The pore specific surface area was measured by the method described above.

In the composite positive active materials used in Examples 1 to 13 and Comparative Examples 1 to 10, the value of x in Formula 1 was set to 1, that is, the composite positive active materials were $LiFePO_4$.

(Fabrication of Positive Electrode)

N-Methylpyrrolidone (NMP) was used as a dispersion medium, and the composite positive active material was used as a positive active material, acetylene black was used as a conductive agent, and PVdF was used as a binder. The composite positive active material, the conductive agent, the binder and the dispersion medium were mixed together. At that time, the mass ratio of solid components, positive active material:conductive agent binder was set to 90:5:5. An appropriate amount of NMP was added to the obtained mixture to adjust the viscosity, thereby preparing a positive composite paste. Next, the positive composite paste was applied to both surfaces of an aluminum foil as a positive substrate, leaving a non-applied portion (positive composite layer non-formed portion), and dried at 120° C., and roll pressing was performed to form a positive composite layer on the positive substrate. The amount of the positive composite paste applied was set to 10 mg/cm$^2$ based on the solid components. The density of the positive composite layer was adjusted by roll pressing. The densities of the positive composite layers in Examples 1 to 8 and Comparative Examples 1 to 7 were measured by the method described above. The results are shown in Table 1. In this manner, positive electrodes of Examples 1 to 13 and Comparative Examples 1 to 10 were obtained.

(Fabrication of Negative Electrode)

Graphite was used as a negative active material, SBR was used as a binder, and CMC was used as a thickener. The negative active material, the binder, the thickener, and water as a dispersion medium were mixed together. At that time, the mass ratio of solid components, negative active material: binder:thickener was set to 97:2:1. An appropriate amount of water was added to the obtained mixture to adjust the viscosity, thereby preparing a negative composite paste. The negative composite paste was applied to both surfaces of a copper foil, leaving a non-applied portion (negative composite layer non-formed portion), and dried to form a negative composite layer. Thereafter, roll pressing was performed to fabricate a negative electrode.

(Preparation of Nonaqueous Electrolyte)

$LiPF_6$ was dissolved at a concentration of 1 mol/dm$^3$ in a mixed solvent in which EC and EMC were mixed at a volume ratio of 3:7 to prepare a nonaqueous electrolyte.

(Fabrication of Nonaqueous Electrolyte Energy Storage Device)

Next, the positive electrode and the negative electrode were stacked with a separator, which was composed of a polyethylene porous membrane substrate and an inorganic layer formed on the polyethylene porous membrane substrate, interposed therebetween to fabricate an electrode assembly. The inorganic layer was disposed on the surface facing the positive electrode. The electrode assembly was housed into an aluminum prismatic case, and a positive electrode terminal and a negative electrode terminal were attached. The nonaqueous electrolyte was injected into the case, and then the inlet was sealed to obtain nonaqueous electrolyte energy storage devices of Examples and Comparative Examples.

(Test of Initial Power Performance in Low Temperature Environment)

The initial power performance [W] in a low temperature environment was evaluated by the following procedure.

On each of the nonaqueous electrolyte energy storage devices of Examples 1 to 8 and Comparative Examples 1 to 7, constant current charge was performed to 3.6 V at a charge current of 0.1 C in an environment of 25° C., and then constant voltage charge was performed at 3.6 V. With regard to the charge termination conditions, charge was performed until the charge current reached 0.02 C. After charge, a pause time of 10 minutes was provided, and then constant current discharge was performed to 2.0 V at a discharge current of 0.1 C in an environment of 25° C. to measure the "discharge capacity at 0.1 C in an environment of 25° C.". Next, assuming that the amount of electricity to be a half of this "discharge capacity at 0.1 C in an environment of 25° C." was SOC50%, constant current charge was performed from a completely discharged state to the SOC50% at a charge current of 0.1 C. After that, the device was stored in an environment of 0° C. for 3 hours and then discharged at a discharge current of 0.1 C for 30 seconds, a pause time of 10 minutes was provided, and then auxiliary charge was performed at a charge current of 0.1 C for 30 seconds. Similarly, the discharge current was adjusted to 0.3 C and 0.5 C, discharge was performed at each of the discharge currents for 30 seconds, a pause time of 10 minutes was provided, and then auxiliary charge was performed at a charge current of 0.1 C until SOC50% was achieved. From the current in each discharge and the battery voltage at the 10th second after the start of discharge, the "power at 0° C. in the initial stage" (indicated as "initial power 0° C." in Table 1) was calculated.

Table 1 shows the test results of initial power performance in a low temperature environment (0° C.).

(Capacity Retention Ratio after Storage)

The capacity retention ratio after storage [%] was evaluated by the following procedure.

On each of the nonaqueous electrolyte energy storage devices of Examples 9 to 13 and Comparative Examples 8 to 10, constant current charge was performed to 3.6 V at a current of 0.1 C in an environment of 25° C., and then constant voltage charge was performed at 3.6 V. With regard to the charge termination conditions, charge was performed until the charge current reached 0.02 C. After charge, a pause time of 10 minutes was provided, and then constant current discharge was performed to 2.0 V at a current of 0.1 C. The discharge capacity at this time was defined as “discharge capacity before storage”.

After that, on the nonaqueous electrolyte energy storage device, constant current charge was performed to 3.6 V at a current of 0.1 C in an environment of 25° C., and then constant voltage charge was performed at 3.6 V. With regard to the charge termination conditions, charge was performed until the charge current reached 0.02 C. After that, the device was stored in an environment of 85° C. for 10 days. After that, constant current discharge was performed to 2.0 V at a current of 0.1 C in an environment of 25° C., further constant current charge was performed to 3.6 V at a current of 0.1 C, and then constant voltage charge was performed at 3.6 V. With regard to the charge termination conditions, charge was performed until the charge current reached 0.02 C. Thereafter, constant current discharge was performed to 2.0 V at a current of 0.1 C. After every charge-discharge, a pause time of 10 minutes was provided. The discharge capacity at this time was defined as “discharge capacity after storage”.

The percentage of “discharge capacity after storage” to “discharge capacity before storage” was calculated by the equation of “discharge capacity after storage”/“discharge capacity before storage”×100, and defined as the “capacity retention ratio after storage”.

Table 2 shows the test results of the capacity retention ratio after storage.

TABLE 1

| | Composite positive active material | | | | | |
|---|---|---|---|---|---|---|
| | pH during precursor production | Calcination temperature [° C.] | Calcination time | Proportion of pore specific surface area of carbon to pore specific surface area of composite positive active material [%] | Positive composite layer Density [g/cm$^2$] | Evaluation Initial power 0° C. [W] |
| Comparative Example 1 | 12 | 525 | 10 min. | 10 | 1.90 | 7 |
| Comparative Example 2 | 10 (without $NH_3$) | 525 | 30 min. | 15 | 1.90 | 8 |
| Example 1 | 10 | 550 | 3 hr. | 20 | 1.90 | 11 |
| Example 2 | 10 | 600 | 3 hr. | 30 | 1.90 | 12 |
| Example 3 | 10 | 650 | 3 hr. | 40 | 1.90 | 12 |
| Example 4 | 10 | 700 | 3 hr. | 50 | 1.90 | 11 |
| Comparative Example 3 | 10 (without $NH_2NH_2$) | 775 | 15 hr. | 55 | 1.90 | 8 |
| Comparative Example 4 | 10 (without $NH_2NH_2$) | 800 | 15 hr. | 60 | 1.90 | 8 |
| Comparative Example 5 | 10 | 600 | 3 hr. | 30 | 1.70 | 8 |
| Comparative Example 6 | 10 | 600 | 3 hr. | 30 | 1.75 | 8 |
| Example 5 | 10 | 600 | 3 hr. | 30 | 1.80 | 11 |
| Example 6 | 10.5 | 600 | 3 hr. | 30 | 1.90 | 12 |
| Example 7 | 10 | 600 | 3 hr. | 30 | 2.00 | 12 |
| Example 8 | 10 | 600 | 3 hr | 30 | 2.10 | 11 |
| Comparative Example 7 | 10 | 600 | 3 hr. | 30 | 2.15 | 7 |

TABLE 2

| | Composite positive active material | | | | |
|---|---|---|---|---|---|
| | Calcination temperature [° C.] | Amount of sucrose powder mixed to amount of composite positive active material [%] | Pore specific surface area of carbon [m$^2$/g] | Proportion of pore specific surface area of carbon to pore specific surface area of composite positive active material [%] | Evaluation Capacity retention ratio after storage [%] |
| Example 9 | 750 | 0.5 | 1.5 | 30 | 95 |
| Example 10 | 725 | 0.8 | 2.1 | 30 | 94 |
| Example 11 | 700 | 1.2 | 3.0 | 30 | 94 |
| Example 12 | 675 | 1.6 | 3.9 | 30 | 93 |
| Example 13 | 650 | 2.0 | 5.0 | 30 | 92 |
| Comparative Example 8 | 625 | 2.3 | 5.8 | 30 | 85 |

TABLE 2-continued

| | Composite positive active material | | | | |
|---|---|---|---|---|---|
| | Calcination temperature [° C.] | Amount of sucrose powder mixed to amount of composite positive active material [%] | Pore specific surface area of carbon [$m^2/g$] | Proportion of pore specific surface area of carbon to pore specific surface area of composite positive active material [%] | Evaluation Capacity retention ratio after storage [%] |
| Comparative Example 9 | 600 | 2.7 | 6.9 | 30 | 83 |
| Comparative Example 10 | 580 | 3.2 | 7.8 | 30 | 82 |

As shown in Table 1, it has been found that Examples 1 to 8 in which a composite positive active material in which at least part of the surface of a positive active material represented by Formula 1 is coated with carbon is contained, the proportion of the pore specific surface area of carbon to the pore specific surface area of the composite positive active material is 20% or more and 50% or less, and the density of the positive composite layer is 1.80 g/cm$^3$ or more and 2.10 g/cm$^3$ or less are superior to Comparative Examples 1 to 7 in the initial power performance in a low temperature environment.

As shown in Table 2, it has been found that Examples 9 to 13 in which a composite positive active material in which at least part of the surface of a positive active material represented by Formula 1 is coated with carbon is contained, the proportion of the pore specific surface area of carbon to the pore specific surface area of the composite positive active material is 20% or more and 50% or less, and the pore specific surface area of carbon is 1.0 m$^2$/g or more and 5.5 m$^2$/g or less are superior to Comparative Examples 8 to 10 in initial power performance in the capacity retention ratio after storage.

From the above results, it has been indicated that the composite positive active material can enhance the initial power performance of a nonaqueous electrolyte energy storage device in a low temperature environment. The positive electrode is suitable for a positive electrode for nonaqueous electrolyte energy storage device used as a power source for electronic devices such as personal computers and communication terminals, motor vehicles, and the like.

DESCRIPTION OF REFERENCE SIGNS

1: Nonaqueous electrolyte energy storage device
2: Electrode assembly
3: Case
4: Positive electrode terminal
41: Positive electrode lead
5: Negative electrode terminal
51: Negative electrode lead
20: Energy storage unit
30: Energy storage apparatus

The invention claimed is:

1. A positive electrode for nonaqueous electrolyte energy storage device comprising a positive composite layer containing a composite positive active material in which at least part of a surface of a positive active material is coated with carbon, wherein a proportion of a pore specific surface area of the carbon to a pore specific surface area of the composite positive active material is 20% or more and 50% or less, a density of the positive composite layer is 1.80 g/cm$^3$ or more and 2.10 g/cm$^3$ or less, and the positive active material is a compound represented by the following Formula 1:

$$LiFe_xMn_{(1-x)}PO_4 \ (0 \leq x \leq 1) \quad 1.$$

2. A positive electrode for nonaqueous electrolyte energy storage device comprising a positive composite layer containing a composite positive active material in which at least part of a surface of a positive active material is coated with carbon, wherein a proportion of a pore specific surface area of the carbon to a pore specific surface area of the composite positive active material is 20% or more and 50% or less, a pore specific surface area of the carbon is 1.0 m$^2$/g or more and 5.5 m$^2$/g or less, and the positive active material is a compound represented by the following Formula 1:

$$LiFe_xMn_{(1-x)}PO_4 \ (0 \leq x \leq 1) \quad 1.$$

3. The positive electrode for nonaqueous electrolyte energy storage device according to claim 1, wherein a pore specific surface area of the carbon is 1.0 m$^2$/g or more and 5.5 m$^2$/g or less.

4. A nonaqueous electrolyte energy storage device comprising the positive electrode according to claim 1.

5. An energy storage apparatus comprising two or more energy storage devices and one or more nonaqueous electrolyte energy storage devices according to claim 4.

* * * * *